United States Patent
Ji et al.

(10) Patent No.: US 11,995,456 B2
(45) Date of Patent: May 28, 2024

(54) INTERFACE DISPLAY METHOD, INTERFACE DISPLAY APPARATUS, AND ELECTRONIC DEVICE

(71) Applicant: VIVO MOBILE COMMUNICATION CO., LTD., Guangdong (CN)

(72) Inventors: Wenbin Ji, Guangdong (CN); Yun Chen, Guangdong (CN); TikFan Chan, Guangdong (CN); Xueliang Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/965,710

(22) Filed: Oct. 13, 2022

(65) Prior Publication Data

US 2023/0032042 A1 Feb. 2, 2023

Related U.S. Application Data

(63) Continuation of application No. PCT/CN2021/086848, filed on Apr. 13, 2021.

(30) Foreign Application Priority Data

Apr. 17, 2020 (CN) .......................... 202010307926.0

(51) Int. Cl.
*G06F 9/451* (2018.01)
*G06F 3/01* (2006.01)
(52) U.S. Cl.
CPC .............. *G06F 9/451* (2018.02); *G06F 3/017* (2013.01)

(58) Field of Classification Search
CPC ...... G06F 9/451; G06F 3/017; G06F 3/04842; G06F 3/0488; G04G 9/00
See application file for complete search history.

(56) References Cited

U.S. PATENT DOCUMENTS

| 2008/0026877 | A1 | 1/2008 | Neel |
| 2016/0299679 | A1* | 10/2016 | Park ..................... G04G 9/0064 |

(Continued)

FOREIGN PATENT DOCUMENTS

| CN | 101539757 A | 9/2009 |
| CN | 105446609 A | 3/2016 |

(Continued)

OTHER PUBLICATIONS

First Office Action for Chinese Application No. 202010307926.0, dated Jan. 26, 2021, 9 Pages.

(Continued)

*Primary Examiner* — Andrey Belousov
(74) *Attorney, Agent, or Firm* — Brooks Kushman P.C.

(57) ABSTRACT

An interface display method, an interface display apparatus, and an electronic device are provided, where the interface display method is applied to the electronic device. The method includes: displaying a time interface, where the time interface includes a first element, the first element being used to indicate the current time; receiving a first input by a user; in response to the first input, displaying a second element corresponding to the first element and canceling display of the first element; receiving a second input by the user; updating a display location of the second element in response to the second input; and updating a screen state of the electronic device in a case that the display location of the second element meets a preset condition.

20 Claims, 4 Drawing Sheets

(56) References Cited

U.S. PATENT DOCUMENTS

| | | | |
|---|---|---|---|
| 2016/0313869 A1 | 10/2016 | Jang et al. | |
| 2017/0046052 A1 | 2/2017 | Lee et al. | |
| 2017/0357427 A1 | 12/2017 | Wilson et al. | |
| 2018/0246577 A1* | 8/2018 | Bostick | G06F 3/0346 |
| 2019/0155224 A1 | 5/2019 | Kang et al. | |

FOREIGN PATENT DOCUMENTS

| | | |
|---|---|---|
| CN | 106060228 A | 10/2016 |
| CN | 106067834 A | 11/2016 |
| CN | 106157245 A | 11/2016 |
| CN | 106647216 A | 5/2017 |
| CN | 107564369 A | 1/2018 |
| CN | 109219788 A | 1/2019 |
| CN | 109669339 A | 4/2019 |
| CN | 109814369 A | 5/2019 |
| CN | 210136400 U | 3/2020 |
| CN | 111538452 A | 8/2020 |
| JP | 2001125555 A | 5/2001 |
| JP | 2005017012 A | 1/2005 |

OTHER PUBLICATIONS

International Search Report and Written Opinion for Application No. PCT/CN2021/086848, dated Jul. 14, 2021, 9 Pages.
First Office Action for Japanese Application No. 2022-562589, dated Oct. 19, 2023, 4 Pages.

* cited by examiner

INTERFACE DISPLAY METHOD, INTERFACE DISPLAY APPARATUS, AND ELECTRONIC DEVICE

CROSS-REFERENCE TO RELATED APPLICATIONS

This application is a continuation of PCT International Application No. PCT/CN2021/086848 filed on Apr. 13, 2021, which claims priority to Chinese Patent Application No. 202010307926.0, filed on Apr. 17, 2020, which are incorporated herein by reference in their entireties.

TECHNICAL FIELD

The present disclosure relates to the field of communications technologies, and in particular, to an interface display method, an interface display apparatus, and an electronic device.

BACKGROUND

With the development of communications technologies, mobile communication functions have been added to many traditional electronic products, for example, emergence of smart watches. various applications can be installed by connecting to the Internet, which enriches the ways that users spend their leisure time and enhances user's life experience.

With an increasing quantity of smart watches, personalized needs are becoming more varied. However, the hour hand, minute hand, and second hand on the dial of a smart watch in the prior art are displayed in an isolated manner, so that the hour hand, minute hand, and second hand in the time interface do not have any cooperation and coordination with each other, resulting in poor user experience.

Therefore, time interfaces in prior-art electronic products have a problem of providing a single display effect and leading to poor user experience.

SUMMARY

According to a first aspect, an embodiment of the present disclosure provides an interface display method, applied to an electronic device, where the method includes:

displaying a time interface, where the time interface includes a first element, the first element being used to indicate the current time;

receiving a first input by a user;

in response to the first input, displaying a second element corresponding to the first element and canceling display of the first element;

receiving a second input by the user;

updating a display location of the second element in response to the second input; and updating a screen state of the electronic device in a case that the display location of the second element meets a preset condition.

According to a second aspect, an embodiment of the present disclosure provides an interface display apparatus, applied to an electronic device, where the apparatus includes:

a first displaying module, configured to display a time interface, where the time interface includes a first element, the first element being used to indicate the current time;

a first receiving module, configured to receive a first input by a user;

a processing module, configured to: in response to the first input, display a second element corresponding to the first element and cancel display of the first element;

a second receiving module, configured to receive a second input by the user;

a first updating module, configured to update a display location of the second element in response to the second input; and a second updating module, configured to update a screen state of the electronic device in a case that the display location of the second element meets a preset condition.

According to a third aspect, an embodiment of the present disclosure provides an electronic device, including a processor, a memory, and a computer program stored in the memory and capable of running on the processor, where when the computer program is executed by the processor, the steps of the foregoing interface display method are implemented.

According to a fourth aspect, an embodiment of the present disclosure provides a computer-readable storage medium, where the computer-readable storage medium stores a computer program, and when the computer program is executed by a processor, the steps of the foregoing interface display method are implemented.

DETAILED DESCRIPTION

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The terms "first", "second", and the like in the embodiments of the present disclosure are used to distinguish between similar objects instead of describing a specific order or sequence. In addition, the terms "include", "have", and any other variants thereof are intended to cover a non-exclusive inclusion. For example, a process, method, system, product, or device that includes a list of steps or units is not necessarily limited to those steps or units that are expressly listed, but may include other steps or units that are not expressly listed or are inherent to such process, method, product, or device.

An interface display method in an embodiment of the present disclosure is applied to electronic devices, where the electronic device may be a mobile phone, a tablet personal computer, a laptop computer, a personal digital assistant (PDA), a mobile internet device (MID), a wearable device, or the like. The electronic device may display time in a digital form, or in a dial form.

The following describes the interface display method in an embodiment of the present disclosure.

Figure 1:
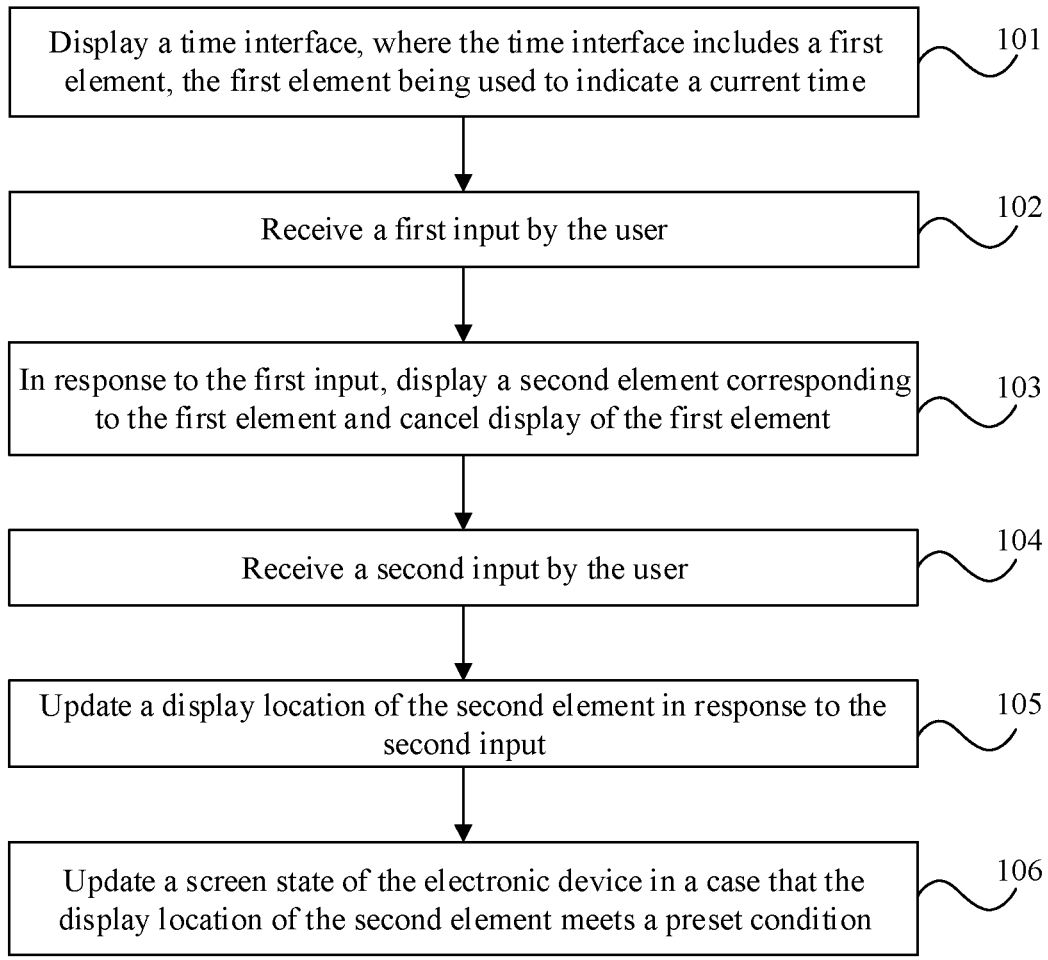
FIG. 1 is a flowchart of an interface display method according to an embodiment of the present disclosure.

Referring to FIG. 1, FIG. 1 is a flowchart of an interface display method according to an embodiment of the present disclosure. As shown in FIG. 1, the interface display method in this embodiment may include the following steps.

Step 101. Display a time interface, where the time interface includes a first element, the first element being used to indicate the current time.

In this step, an electronic device displays the time interface including the first element for indicating the current time, where the time interface may be displayed in a digital form or a dial form. When the time interface is displayed in the digital form, the first element is a number used to indicate time; and when the time interface is displayed in the dial form, the first element is an hour hand, minute hand, and second hand in the dial interface that are used to indicate time, or the first element is one or more of the hour hand, minute hand, or second hand for indicating time in the dial interface.

Figure 2:
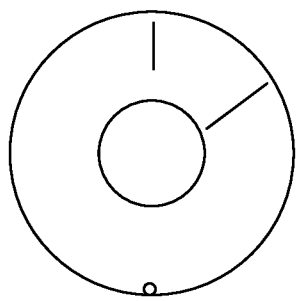
FIG. 2 is a schematic diagram of a time interface in a dial form.

Optionally, when the time interface is displayed in the dial form, the second hand in a small ball form may roll along an outer circumference of the dial at a constant speed, with details shown in FIG. 2.

Step 102. Receive a first input by the user.

After the time interface is presented on a display of the electronic device, the first input performed by the user may be received, where the first input herein may be a movement input to the electronic device, or may be a touch input on the time interface, or may be another type of input, which is not further limited herein.

Step 103. In response to the first input, display a second element corresponding to the first element and cancel display of the first element.

Figure 3:
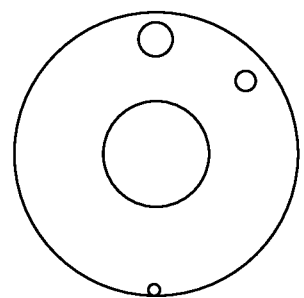
FIG. 3 is a schematic diagram of an hour hand, minute hand, and second hand in a time interface that are switched to a free state according to an embodiment of the present disclosure.

After the first input performed by the user is received, in response to the first input, controlling may be performed to switch from the first element to the second element, the second element is displayed in the time interface, and display of the first element is cancelled. The process of displaying the second element in response to the first input may be as follows: in response to the first input by the user to the time interface, performing controlling to switch from the first element to the second element; or in response to the first input by the user to the electronic device, monitoring movement data of the electronic device and performing controlling to switch from the first element to the second element when movement data of the electronic device meets a preset condition. The second element may be in a free state in the time interface, and the second element is presented in a particular form, such as a small ball. When the time interface is displayed in the dial form, the second element may include small balls corresponding to the hour hand, the minute hand, and the second hand, or small ball(s) corresponding to one or two of the hour hand, the minute hand, and the second hand. For example, referring to FIG. 3, both the hour hand and the minute hand are changed to small balls in a free state. The second element includes small balls corresponding to the hour hand, the minute hand, and the second hand, and the small balls move in the time interface according to user control. The small balls have different corresponding sizes, colors, or movement speeds.

Step 104. Receive a second input by the user.

After the second element corresponding to the first element is displayed in the time interface, the second input performed by the user may be received. The second input herein may be a slide input on the time interface, or a dither input performed on the electronic device, or the like.

Step 105. Update a display location of the second element in response to the second input.

After the second input performed by the user is received, a corresponding movement trajectory in the time interface may be determined according to the second input, and the second element may be controlled to move in the time interface based on the determined movement trajectory, thereby updating the display location of the second element. For example, according to an input by the user tilting the electronic device to left, the second element is controlled to move to left in the time interface, and according to an input by the user flipping the electronic device, the second element is controlled to rotate in place for one circle in the time interface.

Step 106. Update a screen state of the electronic device in a case that the display location of the second element meets a preset condition.

When the display location of the second element is updated according to the second input by the user, it can be detected whether the display location of the second element meets a preset condition. In a case that the display location of the second element meets the preset condition, the screen state of the electronic device is updated. For example, a screen of the electronic device can be controlled to switch to an always on display state with a time interface, and in this state, the time interface still uses the first element to indicate the current time.

In the interface display method in this embodiment of the present disclosure, the time interface can be displayed in a variety of forms, improving interactions between the user and the display interface of the electronic device and thereby enhancing fun of using the electronic device for the user.

Optionally, in an embodiment of the present disclosure, before the receiving a second input by the user, the method further includes:

displaying a target marker.

The updating a screen state of the electronic device in a case that the display location of the second element meets a preset condition includes:

in a case that the second element at least partially overlaps the target marker, canceling display of the second element and updating the screen state of the electronic device.

After in response to the first input, displaying the second element and canceling display of the first element, the electronic device may also display the target marker in the time interface. After the target marker is displayed, the second input by the user may be received, and the display location of the second element is controlled to update according to the second input.

A process of updating the screen state of the electronic device in a case that the display location of the second element meets the preset condition is as follows: cancelling display of the second element when the second element partially overlaps the target marker and updating the screen state of the electronic device. When the screen state of the electronic device is being updated, display of the target marker may be cancelled and the electronic device is controlled to switch to a time interface with the first element indicating the current time. After a specified period of time, the electronic device is controlled to enter an always on display state with a time interface.

Figure 4:
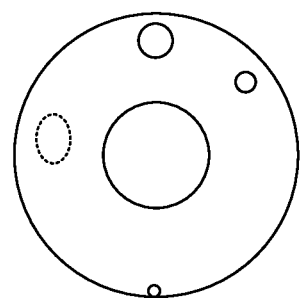
FIG. 4 is a schematic diagram of a target marker displayed in a time interface according to an embodiment of the present disclosure.

The target marker may be a virtual hole formed in the time interface, and the location of the virtual hole may be determined according to a random algorithm. As shown in FIG. 4, a virtual hole is determined in the time interface. In a case that the second element is in the form of a small ball, when the small ball moves to the virtual hole, it can be determined that the second element at least partially overlaps the target marker. In this case, the small ball enters into the virtual hole and disappears, which means that display of the second element is cancelled. After the display of the second element is cancelled, display of the virtual hole can be cancelled, and the time interface is controlled to switch to a state in which the hour hand, minute hand, and second hand are displayed.

The target marker may alternatively be a particular shape formed in the time interface, such as a triangle, a rhombus, or a star, or may be a particular symbol formed in the time interface, such as a plus sign, a minus sign, or a question mark. When the second element comes into contact with the particular shape or the particular symbol, display of the second element can be canceled, and the screen state of the electronic device can be updated.

Figure 5:
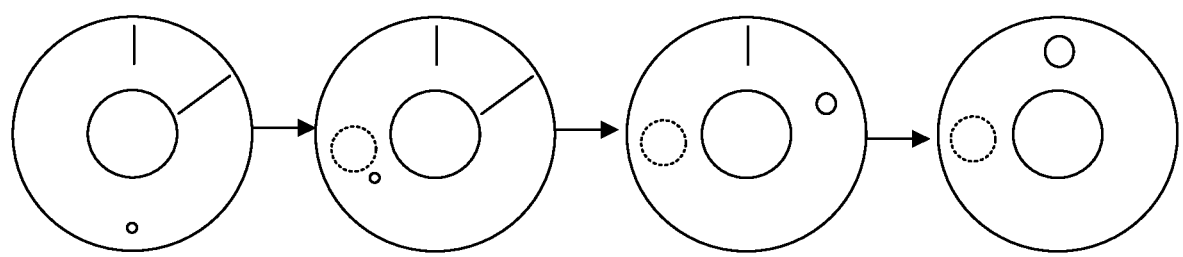
FIG. 5 is a schematic diagram showing change of a time interface according to an embodiment of the present disclosure.

It should be noted that the second element may include a plurality of movement controls, and the plurality of movement controls may be controlled to move, where the plurality of movement controls may move at the same time according to an operation by the user, or after a previous movement control disappears, a next movement control may move according to an operation by the user. For example, the second element includes three movement controls, and the three movement controls are small balls of different sizes. As shown in FIG. 5, a first movement control (corresponding to the second hand) is controlled to move according to an operation by the user. When the first movement control comes into contact with the minute hand, the first movement control may be controlled to bounce back. When the first movement control comes into contact with the target marker, the first movement control disappears. At that point, the hour hand is triggered to change to a second movement control and moves according to an operation by the user. When the second movement control comes into contact with the hour hand, the second movement control may be controlled to bounce back. When the second movement control comes into contact with the target marker, the second movement control disappears. At that point, the hour hand is triggered to change to a third movement control and moves according to an operation by the user. In a case that all the movement controls included in the second element are in contact with the target marker, the second element may be cancelled and the screen state is updated.

In the foregoing implementation process, after controlling is performed to switch from the first element to the second element for displaying, the target marker is displayed in the time interface. In the process of controlling movement of the second element by the user, when the second element at least partially overlaps the target marker, display of the second element is cancelled, and the screen state of the electronic device is updated. In this way, control of the display state of the second element is implemented by using the target marker and the movement of the second element, improving interactions between the user and the time interface and enhancing fun of using the electronic device for the user.

Optionally, in an embodiment of the present disclosure, the updating a screen state of the electronic device in a case that the display location of the second element meets a preset condition includes:

updating the screen state of the electronic device in a case that the display location of the second element is adjacent to or at least partially overlaps a target area.

Figure 6:
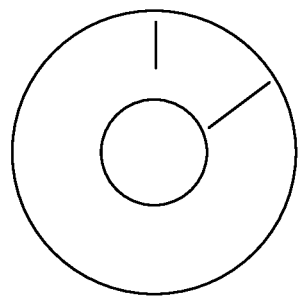
FIG. 6 is a schematic diagram of a time interface for always on display according to an embodiment of the present disclosure.

The target area may be determined in the time interface, where the location of the target area is not specifically limited. When the second element is controlled to move according to the second input by the user, the screen state of the electronic device may be updated when it is detected that the display location of the second element is adjacent to the target area, or the screen state of the electronic device may be updated when it is detected that the display location of the second element at least partially overlaps the target area. The process of updating the screen state of the electronic device is as follows: controlling the electronic device to switch to a time interface with the first element indicating the current time; and after a specified period of time, controlling the electronic device to enter an always on display state with a time interface, where for the always on display state with a time interface of the electronic device, reference may be made to FIG. 6, and at that point, only the hour hand and the minute hand are displayed in the time interface.

For example, when the second element is controlled according to a dither input by the user to the electronic device, to move in the time interface on the trajectory corresponding to the dither input, it is monitored whether the second element is close to a target area in the upper left corner of the time interface. When it is detected that the second element is adjacent to the target area in the upper left corner of the time interface, it may be determined that a trigger condition for updating the screen state is met at that point, and the time interface is controlled to switch to a state displayed with the first element; or when it is detected that the second element at least partially overlaps the target area in the upper left corner of the time interface, the time interface is controlled to switch to a state displayed with the first element, and the always on display is enabled.

In the foregoing implementation process, the display location of the second element is monitored, and the operation of updating the screen state is triggered when the second element is adjacent to or at least partially overlaps the target area. In this way, the screen state update can be performed based on a relative location relationship between the display location of the second element and the target area, enhancing fun of updating the screen state for the user.

On the basis of the foregoing embodiment, optionally, the first element includes a first sub-element, a second sub-element, and a third sub-element, the second element includes a fourth sub-element, a fifth sub-element, and a sixth sub-element, the fourth sub-element corresponds to the first sub-element, the fifth sub-element corresponds to the second sub-element, and the sixth sub-element corresponds to the third sub-element.

The updating a screen state of the electronic device in a case that the display location of the second element meets a preset condition includes:

in a case that a display location of the fourth sub-element is adjacent to or at least partially overlaps a first area, a display location of the fifth sub-element is adjacent to or at least partially overlaps a second area, and a display location of the sixth sub-element is adjacent to or at least partially overlaps a third area, cancelling display of the fourth sub-element, the fifth sub-element, and the sixth sub-element, and updating the screen state of the electronic device; where the first area, the second area, and the third area are at least partially located in the target area, or the first area, the second area, and the third area are all adjacent to the target area.

In this embodiment, the first element in the time interface for indicating time includes the first sub-element, the second sub-element, and the third sub-element. When the time interface is displayed in the digital form, the first sub-element may be a number representing the hour, a number representing the minute, or a number representing the second. The corresponding second sub-element may be a number representing the hour, a number representing the minute, or a number representing the second, and is distinct from the first sub-element. The third sub-element may be a number representing the hour, a number representing the minute, or a number representing the second, and is different from the first sub-element and the second sub-element. When the time interface is displayed in the dial form, the first sub-element may be one of the hour hand, minute hand, and second hand, the second sub-element may be another one of the hour hand, minute hand, and second hand, and the third sub-element may be the remaining one of the hour hand, minute hand, and second hand.

The second element corresponding to the first element includes: the fourth sub-element corresponding to the first sub-element, the fifth sub-element corresponding to the second sub-element, and the sixth sub-element corresponding to the third sub-element. In addition, the time interface further includes the first area, the second area, and the third area, where the first area, the second area, and the third area are at least partially located in the target area, or the first area, the second area, and the third area are all adjacent to the target area. The case in which the first area, the second area, and the third area are at least partially located in the target area may be as follows: The first area, the second area, and the third area are all located in the target area; or part of the first area, part of the second area, and part of the third area are located in the target area; or part of the first area, part of the second area, and the third area are located in the target area; or part of the first area, the second area, and part of the third area are located in the target area. Other cases may alternatively be present, which are not listed one by one herein. For the case in which the first area, the second area, and the third area are all adjacent to the target area, a corresponding pattern may be as follows: The first area and the second area are located on two sides adjacent to the target area, and the third area is located between the first area and the second area and is adjacent to the target area. Other patterns may alternatively be present, which are not listed one by one herein.

A process of updating the screen state of the electronic device in a case that the display location of the second element meets a preset condition is as follows: controlling display locations of the fourth sub-element, the fifth sub-element, and the sixth sub-element to update according to the second input by the user; cancelling display of the fourth sub-element, the fifth sub-element, and the sixth sub-element in a case that the display location of the fourth sub-element is adjacent to the first area, the display location of the fifth sub-element is adjacent to the second area, and the display location of the sixth sub-element is adjacent to the third area; and controlling the electronic device to switch to a time interface state with the first element indicating the current time.

A process of updating the screen state of the electronic device may alternatively be as follows: cancelling display of the fourth sub-element, the fifth sub-element, and the sixth sub-element when the user controls the second element to move, the display location of the fourth sub-element at least partially overlaps the first area, the display location of the fifth sub-element at least partially overlaps the second area, and the display location of the sixth sub-element at least partially overlaps the third area; controlling the electronic device to switch to a time interface with the first element indicating the current time; and after a specified period of time, entering an always on display state with a time interface.

A process of updating the screen state of the electronic device may alternatively be as follows: controlling display locations of the fourth sub-element, the fifth sub-element, and the sixth sub-element to update according to the second input by the user; cancelling display of the fourth sub-element, the fifth sub-element, and the sixth sub-element in a case that the display location of the fourth sub-element at least partially overlaps the first area, the display location of the fifth sub-element is adjacent to the second area, and the display location of the sixth sub-element at least partially overlaps the third area; and controlling the electronic device to switch to a time interface state with the first element indicating the current time.

It is noted that a process of controlling the screen state of the electronic device to update may further include other implementations, which are not listed one by one herein.

The following describes overall implementation of updating the screen state of the electronic device according to controlling performed by the user by using an example in which the first sub-element is the second hand, the second sub-element is the minute hand, the third sub-element is the hour hand, and the fourth sub-element, the fifth sub-element, and the sixth sub-element are presented in form of small balls.

When the electronic device is in a screen-on state, a time interface in a dial form is displayed. Details may refer to FIG. 2. The first sub-element (second hand) rotates along the outer circumference of the dial in the form of a small ball. When a movement state of the electronic device monitored by a gyroscope changes and movement data of the electronic device meets a preset condition, controlling is performed to switch from the first element to the second element. At that point, both the second sub-element (minute hand) and the third sub-element (hour hand) are changed to small balls, which means that the second sub-element is changed to the fifth sub-element, the third sub-element is changed to the sixth sub-element, and the first sub-element is changed to the fourth sub-element (no longer moving along the outer circumference of the dial and being in a free state in the dial interface). The fourth sub-element, the fifth sub-element, and the sixth sub-element all enter a free state and move at their respective speeds according to controlling performed by the user. When the fourth sub-element at least partially overlaps the first area, the fifth sub-element at least partially overlaps the second area, and the sixth sub-element at least partially overlaps the third area, display of the fourth sub-element, the fifth sub-element, and the sixth sub-element may be cancelled, the electronic device is controlled to switch to a time interface with the first element indicating the current time, and after a specified period of time, the electronic device enters an always on display state with a time interface.

In the foregoing process, when the sub-elements included in the second element are adjacent to and/or at least partially overlap their corresponding areas, display of the second element may be cancelled and the screen state may be updated, which allows the time interface to change to an original state by controlling movement of the sub-elements, thereby improving interactions between the user and the electronic device and enhancing fun.

Optionally, in an embodiment of the present disclosure, the updating a display location of the second element includes:

updating, based on a posture parameter of the electronic device, the display location of the second element.

In this embodiment, the electronic device obtains a posture parameter of the electronic device according to the second input by the user, and determines, based on the obtained posture parameter, a movement trajectory, and then controls the second element to move on the determined movement trajectory to update the display location of the second element.

The second input by the user may be a dither input, a movement input, or the like performed on the electronic device. By monitoring the dither input or movement input by the user, and controlling the second element to move, a location update of the second element may be implemented simultaneously with the input by the user.

For example, after the first element is displayed in the time interface, and controlling is performed to switch from the first element to the second element for displaying, shaking of the electronic device by the user may be received. A shaking direction and shaking frequency of the electronic device may be monitored by the gyroscope, and a movement direction and movement speed corresponding to the shaking operation by the user are determined. In this case, the second element may be controlled to move in the determined movement direction and movement speed according to the shaking by the user, so as to update the display location of the second element.

Alternatively, after the second element is displayed in the time interface, a rotation input performed by the user on the electronic device on a horizontal table can be received, and a rotation direction and rotation speed of the electronic device may be monitored by the gyroscope to determine a rotation trajectory and rotation speed corresponding to the second element and then to control rotation of the second element, so as to control the location update of the second element.

In the foregoing process, the posture parameter of the electronic device is obtained according to the second input by the user, and the display location of the second element is controlled to update according to the posture parameter of the electronic device, so that the movement of the second element can be simultaneously controlled according to an operation by the user, thereby improving interactions between the user and the electronic device and enhancing fun of using the electronic device for the user.

Optionally, in an embodiment of the present disclosure, the time interface further includes a third element, the third element being used to indicate the current time.

The updating a screen state of the electronic device in a case that the display location of the second element meets a preset condition includes:

in a case that the display location of the second element is adjacent to or at least partially overlaps a display location of the third element, displaying a fourth element corresponding to the third element and canceling display of the second element and the third element;

receiving a third input by the user;

updating a display location of the fourth element in response to the third input; and updating the screen state of the electronic device in a case that the display location of the fourth element meets a preset condition.

In this embodiment, the first element may be a number for indicating time, or may be a hand in the dial interface. When the first element is a number for indicating time, the first element may be a number corresponding to the hour hand, a number corresponding to the second hand, and a number corresponding to the minute hand, or may alternatively be one or two of a number corresponding to the hour hand, a number corresponding to the second hand, and a number corresponding to the minute hand. When the first element is a hand in the dial interface, the first element may be the hour hand, minute hand, or second hand for indicating time, or the first element is one or two of the hour hand, minute hand, or second hand for indicating time.

When the first element is a number corresponding to the hour hand, a number corresponding to the second hand, and a number corresponding to the minute hand, the third element may be numbers corresponding to current accurate time in the time interface. When the first element is the hour hand, minute hand, and second hand for indicating time, the third element may be the hour hand, minute hand, and second hand corresponding to the current time in the time interface.

It should be noted that the time corresponding to the first element is different from the time corresponding to the third element, and the current time mentioned in the following description is the time corresponding to the third element.

When the first element is a number corresponding to the hour hand, a number corresponding to the second hand, or a number corresponding to the minute hand, the third element may be an hour hand number, a minute hand number, and a second hand number, corresponding to the current time in the time interface. The third element may alternatively be one or two of an hour hand number, a minute hand number, and a second hand number, corresponding to the current time in the time interface, and is different from that indicated by the first element. That is, when the first element is a number corresponding to the hour hand, the third element is a number corresponding to the minute hand and/or second hand; when the first element is a number corresponding to the minute hand, the third element is a number corresponding to the hour hand and/or second hand; and when the first element is a number corresponding to the second hand, the third element is a number corresponding to the minute hand and/or hour hand.

When the first element is the hour hand, minute hand, or second hand for indicating time, the third element may be one or two of the hour hand, minute hand, or second hand, corresponding to the current time in the time interface, and is different from that indicated by the first element. To be specific, when the first element is the second hand for indicating time, the third element is the minute hand and/or hour hand for indicating the current time; when the first element is the minute hand for indicating time, the third element is the hour hand and/or second hand for indicating the current time; and when the first element is the hour hand for indicating time, the third element is the minute hand and/or second hand for indicating the current time.

When the first element is two of a number corresponding to the hour hand, a number corresponding to the second hand, and a number corresponding to the minute hand, the third element may be an hour hand number, a minute hand number, and a second hand number corresponding to the current time in the time interface. The third element may alternatively be number(s) corresponding to a remaining hand, and is used to indicate the current time. To be specific, when the first element is a number corresponding to the hour hand and a number corresponding to the minute hand, the third element is a number corresponding to the second hand; when the first element is a number corresponding to the hour hand and a number corresponding to the second hand, the third element is a number corresponding to the minute hand; and when the first element is a number corresponding to the second hand and a number corresponding to the minute hand, the third element is a number corresponding to the hour hand.

When the first element is two of the hour hand, minute hand, and second hand for indicating time, the third element may be a remaining hand, and is used to indicate the current time. To be specific, when the first element is the second hand and minute hand for indicating time, the third element is the hour hand for indicating the current time; when the first element is the second hand and hour hand for indicating time, the third element is the minute hand for indicating the current time; and when the first element is the hour hand and minute hand for indicating time, the third element is the second hand for indicating the current time.

When the second element moves in a particular form, the display location of the second element is monitored. In a case that the display location of the second element is adjacent to or at least partially overlaps the display location of the third element, a switching may be triggered for the third element, to switch from the third element to the fourth element, and then display of the second element and the third element may be cancelled. When being cancelled, the second element and the third element may be canceled automatically, or may be canceled according to touch operations on the second element and the third element by the user.

Then according to the third input by the user to the electronic device, the display location of the fourth element is updated. The display location of the fourth element is monitored to determine whether the display location of the fourth element meets a preset condition. In a case that the display location of the fourth element meets the preset condition, the screen state of the electronic device may be updated. When the screen state of the electronic device is being updated, the electronic device may be controlled to switch to a time interface indicating the current time in a digital or dial form. After a specified period of time, the electronic device is controlled to enter an always on display state with a time interface.

When the first element is a number corresponding to the hour hand, a number corresponding to the second hand, and a number corresponding to the minute hand, the second element includes movement controls of particular forms corresponding to the three numbers respectively, the third element is numbers corresponding to current accurate time in the time interface. In a case that the three movement controls included in the second element are adjacent to or at least partially overlap the display locations of the third element respectively, a switching may be triggered for the third element. When the first element is a number corresponding to the hour hand, a number corresponding to the second hand, or a number corresponding to the minute hand, the second element includes a movement control. In a case that the movement control included in the second element is adjacent to or at least partially overlaps the display location of the third element, a switching may be triggered for the third element. When the first element is two of a number corresponding to the hour hand, a number corresponding to the second hand, and a number corresponding to the minute hand, the second element includes two movement controls. In a case that the two movement controls included in the second element are adjacent to or at least partially overlap the display locations of the third element respectively, a switching may be triggered for the third element. The case of triggering a switching for the third element when the first element is the hand(s) in the dial interface is similar to the foregoing case, and details are not described herein again.

In the foregoing process, an update speed of the display location of the fourth element is different from an update speed of the display location of the second element, which means that movement speeds corresponding to the second element and the fourth element are different. Through movement speed measurement, the element that is moving in the current interface may be accurately identified.

The foregoing implementations are described below with specific examples. The first element is a number corresponding to the hour hand, a number corresponding to the second hand, and a number corresponding to the minute hand. In this case, the number 10:32 (56) is displayed in the time interface, indicating that the current time is 10:32:56. After controlling is performed to switch from the first element to the second element, the three movement controls (such as small balls) corresponding to the second element may be in a free state, and the three movement controls are controlled to move along a first specified trajectory according to manipulation by the user. When the second element moves according to an operation by the user, the third element 10:33 (01) is displayed in the time interface, indicating that the current time is 10:33:01, and the third element is continuously updated. In a case that all of the three movement controls are adjacent to or at least partially overlap the display location of the third element, a switching is controlled from the third element to the fourth element, and the fourth element is controlled to move along the second specified trajectory according to manipulation by the user. The movement speed corresponding to the fourth element is different from the movement speed corresponding to the second element, movement speeds of the three movement controls corresponding to the second element may also be different, and movement speeds of the corresponding three movement controls corresponding to the fourth element may also be different.

When the first element is the second hand for indicating time, after controlling is performed to switch from the first element to the second element, a movement control (such as a small ball) corresponding to the second element may be in a free state and move along a third specified trajectory according to manipulation by the user. The third element is the minute hand and hour hand for indicating the current time. When the movement control is adjacent to the minute hand and hour hand respectively, a switching is controlled from the third element to the fourth element. At that point, a movement control corresponding to the second element may disappear automatically, or disappear after moving to a specified area. Alternatively, in a case that the movement control corresponding to the second element comes into contact with the minute hand or hour hand, the movement control corresponding to the second element is controlled to bounce back. When the movement control corresponding to the second element moves to a specified area, the movement control corresponding to the second element is controlled to disappear, and controlling is performed to switch from the third element to the fourth element. After the fourth element is displayed, the electronic device controls the two movement controls corresponding to the fourth element to move along a fourth specified trajectory according to manipulation by the user. Speeds of the two movement controls corresponding to the fourth element may be different, and the speeds of the two movement controls corresponding to the fourth element may also be different from a speed of the movement control corresponding to the second element.

In the foregoing implementation process, the third element is displayed. When the display location of the second element meets the preset condition, the fourth element corresponding to the third element is displayed, and the display location of the fourth element is updated according to the input by the user. in a case that the display location of the fourth element meets the preset condition, the screen state of the electronic device is updated. In this way, the screen can be updated according to the operations by the user on the movement controls, improving interactions between the user and the electronic device and enhancing fun of using the electronic device for the user.

Optionally, when the first element is a number corresponding to the hour hand, a number corresponding to the second hand, or a number corresponding to the minute hand, or when the first element is the hour hand, minute hand, or second hand for indicating time, the time interface further includes a fifth element, the fifth element being used to indicate the current time.

The updating the screen state of the electronic device in a case that the display location of the fourth element meets a preset condition includes:

in a case that the display location of the fourth element is adjacent to or at least partially overlaps a display location of the fifth element, displaying a sixth element corresponding to the fifth element and canceling display of the fourth element and the fifth element;

receiving a fourth input by the user;

updating a display location of the sixth element in response to the fourth input; and updating the screen state of the electronic device in a case that the display location of the sixth element meets a preset condition.

In this embodiment, when the first element is a number for indicating time, the first element is a number corresponding to the hour hand, the third element is a number corresponding to the minute hand, and the fifth element is a number corresponding to the second hand; or the first element is a number corresponding to the hour hand, the third element is a number corresponding to the second hand, and the fifth element is a number corresponding to the minute hand; or the first element is a number corresponding to the minute hand, and the third element is a number corresponding to the hour hand, and the fifth element is a number corresponding to the second hand; or the first element is a number corresponding to the minute hand, the third element is a number corresponding to the second hand, and the fifth element is a number corresponding to the hour hand; or the first element is a number corresponding to the second hand, the third element is a number corresponding to the minute hand, and the fifth element is a number corresponding to the hour hand; or the first element is a number corresponding to the second hand, the third element is a number corresponding to the hour hand, and the fifth element is a number corresponding to the minute hand.

When the first element is a hand in the dial interface, the first element is the hour hand for indicating time, the third element is the minute hand for indicating time, and the fifth element is the second hand for indicating time; or the first element is the hour hand for indicating time, the third element is the second hand for indicating time, and the fifth element is the minute hand for indicating time; or the first element is the minute hand for indicating time, and the third element is the hour hand for indicating time, and the fifth element is the second hand for indicating time; or the first element is the minute hand for indicating time, the third element is the second hand for indicating time, and the fifth element is the hour hand for indicating time; or the first element is the second hand for indicating time, the third element is the minute hand for indicating time, and the fifth element is the hour hand for indicating time; or the first element is the second hand for indicating time, the third element is the hour hand for indicating time, and the fifth element is the minute hand for indicating time.

When the fourth element moves in a particular form, the display location of the fourth element is monitored. In a case that the display location of the fourth element is adjacent to or at least partially overlaps the display location of the fifth element, a switching may be triggered for the fifth element, to switch from the fifth element to the sixth element, and then display of the fourth element and the fifth element may be cancelled. In addition, according to the fourth input by the user to the electronic device, the display location of the sixth element is updated. The display location of the sixth element is monitored to determine whether the display location of the sixth element meets a preset condition. In a case that the display location of the sixth element meets the preset condition, the screen state of the electronic device may be updated. When the screen state of the electronic device is being updated, the electronic device may be controlled to switch to a time interface indicating the current time in a digital or dial form. After a specified period of time, the electronic device is controlled to enter an always on display state with a time interface.

In the foregoing process, an update speed of the display location of the fourth element is different from an update speed of the display location of the sixth element, which means that movement speeds corresponding to the sixth element and the fourth element are different. Through movement speed measurement, the element that is moving in the current interface may be accurately identified.

The following describes the case of updating the screen state of the electronic device by using a specific example. When the electronic device is in a screen-on mode, a time interface is displayed. The displayed interface includes the second hand (the first element) displayed in form of a small ball, and the second hand moves on the outer circumference of the dial. When a posture change of the electronic device is monitored, the small ball is controlled to leave the outer circumference and enter a free movement state (controlling is performed to switch from the first element to the second element) and moves on a specified trajectory according to manipulation by the user. When the small ball is adjacent to or at least partially overlaps the minute hand (third element), controlling may be performed to switch from the third element to the fourth element (the minute hand changes to a particular form, such as a small ball), display of the second element and the third element is cancelled, and the display location of the fourth element is updated according to an operation by the user. In a case that the display location of the fourth element is adjacent to or at least partially overlaps a display location of the fifth element (the hour hand), controlling is performed to switch from the fifth element to the sixth element, display of the fourth element and the fifth element is cancelled, the display location of the sixth element is controlled to update according to an operation by the user, and in a case that the display location of the sixth element meets a preset condition, the screen state is updated.

In the foregoing implementation process, the fifth element is displayed. When the display location of the fourth element meets the preset condition, the sixth element corresponding to the fifth element is displayed, and the display location of the sixth element is updated according to the input by the user. in a case that the display location of the sixth element meets the preset condition, the screen state of the electronic device is updated. In this way, the screen can be updated according to the operations by the user on the movement controls, improving interactions between the user and the electronic device and enhancing fun of using the electronic device for the user.

The foregoing is the implementation process of the interface display method according to this embodiment of the present disclosure. The time interface including the first element for indicating the current time is displayed, controlling is performed according to the first input by the user to switch from the first element to the second element, the display location of the second element is updated according to the second input by the user, and the screen state is updated when the display location of the second element meets the preset condition. In this way, the time interface can be displayed in a variety of forms, improving interactions between the user and the display interface of the electronic device and thereby enhancing fun of using the electronic device for the user.

Figure 7:
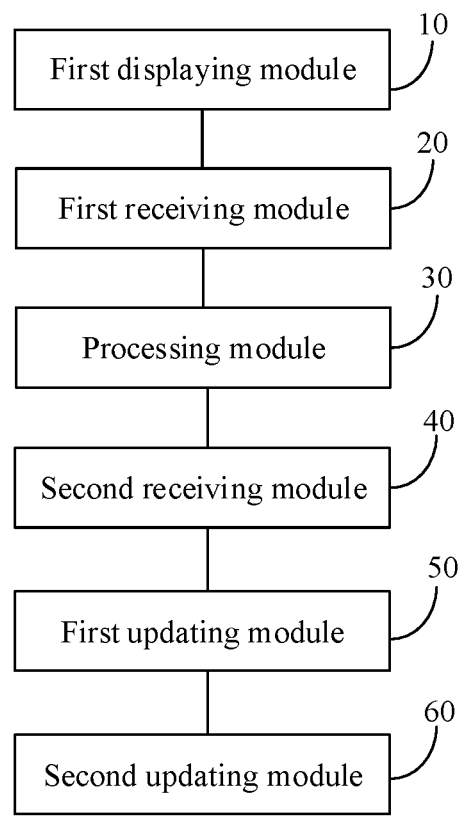
FIG. 7 is a schematic diagram of an interface display apparatus according to an embodiment of the present disclosure.

An embodiment of the present disclosure further provides an interface display apparatus, applied to an electronic device. As shown in FIG. 7, the apparatus includes:

a first displaying module 10, configured to display a time interface, where the time interface includes a first element, the first element being used to indicate the current time;

a first receiving module 20, configured to receive a first input by a user;

a processing module 30, configured to: in response to the first input, display a second element corresponding to the first element and cancel display of the first element;

a second receiving module 40, configured to receive a second input by the user;

a first updating module 50, configured to update a display location of the second element in response to the second input; and a second updating module 60, configured to update a screen state of the electronic device in a case that the display location of the second element meets a preset condition.

Optionally, the apparatus further includes:

a second displaying module, configured to display a target marker before the second receiving module receives the second input by the user; where the second updating module is further configured to: in a case that the second element at least partially overlaps the target marker, cancel display of the second element, and update the screen state of the electronic device.

Optionally, the second updating module is further configured to:

update the screen state of the electronic device in a case that the display location of the second element is adjacent to or at least partially overlaps a target area.

Optionally, the first element includes a first sub-element, a second sub-element, and a third sub-element, the second element includes a fourth sub-element, a fifth sub-element, and a sixth sub-element, the fourth sub-element corresponds to the first sub-element, the fifth sub-element corresponds to the second sub-element, and the sixth sub-element corresponds to the third sub-element.

The second updating module is further configured to:

in a case that a display location of the fourth sub-element is adjacent to or at least partially overlaps a first area, a display location of the fifth sub-element is adjacent to or at least partially overlaps a second area, and a display location of the sixth sub-element is adjacent to or at least partially overlaps a third area, cancel display of the fourth sub-element, the fifth sub-element, and the sixth sub-element, and update the screen state of the electronic device; where the first area, the second area, and the third area are at least partially located in the target area, or the first area, the second area, and the third area are all adjacent to the target area.

Optionally, the first updating module is further configured to: update, based on a posture parameter of the electronic device, the display location of the second element.

Optionally, the time interface further includes a third element, the third element being used to indicate the current time.

The second updating module includes:

a first processing sub-module, configured to: in a case that the display location of the second element is adjacent to or at least partially overlaps a display location of the third element, display a fourth element corresponding to the third element and cancel display of the second element and the third element;

a first receiving sub-module, configured to receive a third input by the user;

a first updating sub-module, configured to update a display location of the fourth element in response to the third input; and a second updating sub-module, configured to update the screen state of the electronic device in a case that the display location of the fourth element meets a preset condition.

Optionally, the time interface further includes a fifth element, the fifth element being used to indicate the current time.

The second updating module includes:

a second processing sub-module, configured to: in a case that the display location of the fourth element is adjacent to or at least partially overlaps a display location of the fifth element, display a sixth element corresponding to the fifth element and cancel display of the fourth element and the fifth element;

a second receiving sub-module, configured to receive a fourth input by the user;

a third updating sub-module, configured to update a display location of the sixth element in response to the fourth input; and a fourth updating sub-module, configured to update the screen state of the electronic device in a case that the display location of the sixth element meets a preset condition.

Optionally, an update speed of the display location of the fourth element is different from an update speed of the display location of the second element.

In the interface display apparatus according to this embodiment of the present disclosure, the time interface including the first element for indicating the current time is displayed, controlling is performed according to the first input by the user to switch from the first element to the second element, the display location of the second element is updated according to the second input by the user, and the screen state is updated when the display location of the second element meets the preset condition. In this way, the time interface can be displayed in a variety of forms, improving interactions between the user and the display interface of the electronic device and thereby enhancing fun of using the electronic device for the user.

Figure 8:
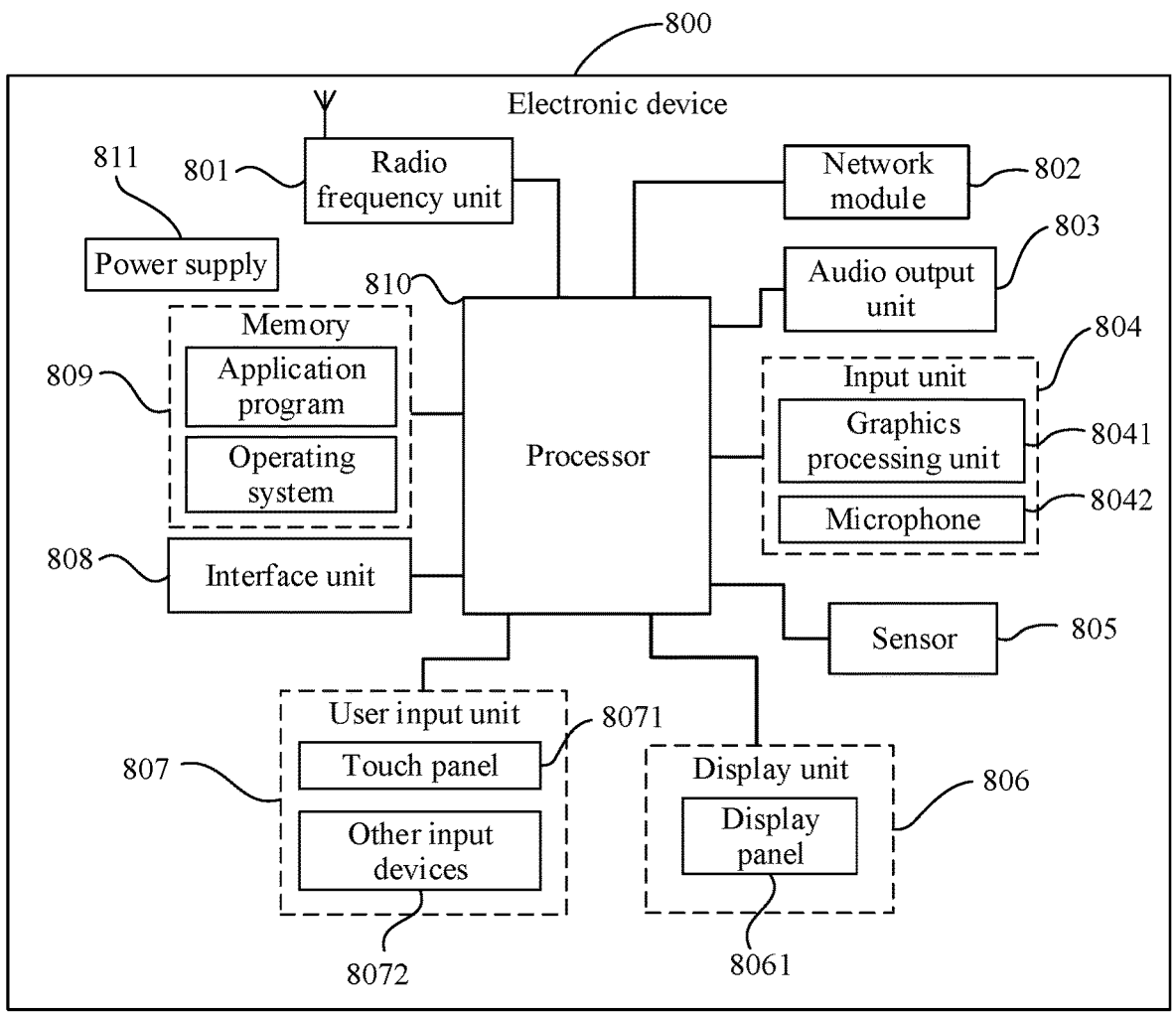
FIG. 8 is a schematic diagram of a hardware structure of an electronic device according to an embodiment of the present disclosure.

FIG. 8 is a schematic diagram of a hardware structure of an electronic device for implementing the embodiments of the present disclosure. The electronic device 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811.

A person skilled in the art can understand that the structure of the electronic device shown in FIG. 8 does not constitute a limitation on the electronic device. The electronic device may include more or fewer components than those shown in the figure, or combination of some components, or components disposed differently. In this embodiment of the present disclosure, the electronic device includes but is not limited to a mobile phone, a tablet personal computer, a notebook computer, a palmtop computer, a vehicle-mounted terminal, a wearable device, a pedometer, or the like.

The display unit 806 is configured to display a time interface, where the time interface includes a first element, the first element being used to indicate the current time. The user input unit 807 is configured to receive a first input by a user. The processor 810 is configured to: in response to the first input, control the display unit 806 to display a second element corresponding to the first element, and cancel display of the first element. The user input unit 807 is further configured to receive a second input by the user. The processor 810 is further configured to update a display location of the second element in response to the second input, and update a screen state of the electronic device in a case that the display location of the second element meets a preset condition.

Optionally, before receiving the second input by the user, the display unit 806 is further configured to display a target marker. When updating a screen state of the electronic device in a case that the display location of the second element meets a preset condition, the processor 810 is further configured to: in a case that the second element at least partially overlaps the target marker, cancel display of the second element, and update the screen state of the electronic device.

Optionally, when updating a screen state of the electronic device in a case that the display location of the second element meets a preset condition, the processor 810 is further configured to update the screen state of the electronic device in a case that the display location of the second element is adjacent to or at least partially overlaps a target area.

Optionally, the first element includes a first sub-element, a second sub-element, and a third sub-element, the second element includes a fourth sub-element, a fifth sub-element, and a sixth sub-element, the fourth sub-element corresponds to the first sub-element, the fifth sub-element corresponds to the second sub-element, and the sixth sub-element corresponds to the third sub-element. When updating a screen state of the electronic device in a case that the display location of the second element meets a preset condition, the processor 810 is further configured to:

in a case that a display location of the fourth sub-element is adjacent to or at least partially overlaps a first area, a display location of the fifth sub-element is adjacent to or at least partially overlaps a second area, and a display location of the sixth sub-element is adjacent to or at least partially overlaps a third area, cancel display of the fourth sub-element, the fifth sub-element, and the sixth sub-element, and update the screen state of the electronic device; where the first area, the second area, and the third area are at least partially located in the target area, or the first area, the second area, and the third area are all adjacent to the target area.

Optionally, during updating of a display location of the second element, the processor 810 is further configured to: update, based on a posture parameter of the electronic device, the display location of the second element.

Optionally, the time interface further includes a third element, the third element being used to indicate the current time. When updating a screen state of the electronic device in a case that the display location of the second element meets a preset condition, the processor 810 is further configured to: in a case that the display location of the second element is adjacent to or at least partially overlaps a display location of the third element, control the display unit 806 to display a fourth element corresponding to the third element and cancel display of the second element and the third element; the user input unit 807 is further configured to receive a third input by the user; and the processor 810 is further configured to: update a display location of the fourth element in response to the third input, and update the screen state of the electronic device in a case that the display location of the fourth element meets a preset condition.

Optionally, the time interface further includes a fifth element, the fifth element being used to indicate the current time. When updating the screen state of the electronic device in a case that the display location of the fourth element meets a preset condition, the processor 810 is further configured to:

in a case that the display location of the fourth element is adjacent to or at least partially overlaps a display location of the fifth element, control the display unit 806 to display a sixth element corresponding to the fifth element and cancel display of the fourth element and the fifth element.

The user input unit 807 is further configured to receive a fourth input by the user.

The processor 810 is further configured to: update a display location of the sixth element in response to the fourth input, and update the screen state of the electronic device in a case that the display location of the sixth element meets a preset condition.

Optionally, an update speed of the display location of the fourth element is different from an update speed of the display location of the second element.

In this way, the time interface including the first element for indicating the current time is displayed, controlling is performed according to the first input by the user to switch from the first element to the second element, the display location of the second element is updated according to the second input by the user, and the screen state is updated when the display location of the second element meets the preset condition. In this way, the time interface can be displayed in a variety of forms, improving interactions between the user and the display interface of the electronic device and thereby enhancing fun of using the electronic device for the user.

It should be understood that, in this embodiment of the present disclosure, the radio frequency unit 801 may be configured to receive and transmit signals in an information receiving and transmitting process or a call process. Specifically, the radio frequency unit 801 receives downlink data from a base station and then delivers the downlink data to the processor 810 for processing. In addition, the radio frequency unit 801 transmits uplink data to the base station. Generally, the radio frequency unit 801 includes but is not limited to an antenna, at least one amplifier, a transceiver, a coupler, a low noise amplifier, and a duplexer. In addition, the radio frequency unit 801 may further communicate with a network and another device by using a wireless communications system.

The electronic device provides wireless broadband Internet access for a user by using the network module 802, for example, helping the user send and receive e-mails, browse web pages, and access streaming media.

The audio output unit 803 may convert audio data received by the radio frequency unit 801 or the network module 802 or stored in the memory 809 into an audio signal and output the audio signal as a sound. In addition, the audio output unit 803 may further provide audio output (for example, a call signal received sound or a message received sound) related to a specific function performed by the electronic device 800. The audio output unit 803 includes a speaker, a buzzer, a receiver, and the like.

The input unit 804 is configured to receive an audio signal or a video signal. The input unit 804 may include a graphics processing unit (GPU) 8041 and a microphone 8042, and the graphics processing unit 8041 processes image data of a static picture or a video obtained by an image capture apparatus (for example, a camera) in an image capture mode or a video capture mode. A processed image frame may be displayed on the display unit 806. The image frame processed by the graphics processing unit 8041 may be stored in the memory 809 (or another storage medium) or transmitted by the radio frequency unit 801 or the network module 802. The microphone 8042 may receive sounds and process such sounds into audio data. The processed audio data may be converted in a telephone call mode into a format that can be transmitted by the radio frequency unit 801 to a mobile communications base station, for outputting.

The electronic device 800 further includes at least one sensor 805, for example, an optical sensor, a motion sensor, and other sensors. Specifically, the optical sensor includes an ambient light sensor and a proximity sensor. The ambient light sensor may adjust brightness of a display panel 8061 based on intensity of ambient light, and the proximity sensor may turn off the display panel 8061 and/or backlight when the electronic device 800 moves close to an ear. As a type of motion sensor, an accelerometer sensor can detect magnitudes of accelerations in all directions (usually three axes), can detect a magnitude and a direction of gravity when in a static state, and can be applied to posture recognition (such as screen switching between portrait and landscape, related games, and magnetometer posture calibration) of the electronic device, functions related to vibration recognition (such as a pedometer and tapping), and the like. The sensor 805 may also include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information input by the user or information provided for the user. The display unit 806 may include the display panel 8061. The display panel 8061 may be configured in a form of a liquid crystal display (LCD), an organic light-emitting diode (OLED), or the like.

The user input unit 807 may be configured to: receive input digit or character information and generate key signal input related to user settings and function control of the electronic device. Specifically, the user input unit 807 includes a touch panel 8071 and other input devices 8072.

The touch panel 8071, which is also referred to as a touchscreen, may capture a touch operation performed by a user on or near the touch panel 8071 (for example, an operation performed by the user on the touch panel 8071 or near the touch panel 8071 by using any appropriate object or accessory such as a finger or a stylus). The touch panel 8071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touch point coordinates, transmits the touch point coordinates to the processor 810, and receives and executes a command transmitted by the processor 810. In addition, the touch panel 8071 may be implemented in a plurality of forms, for example, as a resistive, capacitive, infrared, or surface acoustic wave touch panel. In addition to the touch panel 8071, the user input unit 807 may further include other input devices 8072. Specifically, the other input devices 8072 may include but are not limited to a physical keyboard, a function button (for example, a volume control button or a power button), a trackball, a mouse, and a joystick. Details are not described herein.

Further, the touch panel 8071 may cover the display panel 8061. After detecting a touch operation on or near the touch panel 8071, the touch panel 8071 transmits the touch operation to the processor 810 to determine a type of a touch event. Then the processor 810 provides corresponding visual output on the display panel 8061 based on the type of the touch event. In FIG. 8, the touch panel 8071 and the display panel 8061 serve as two separate components to implement input and output functions of the electronic device. However, in some embodiments, the touch panel 8071 and the display panel 8061 may be integrated to implement the input and output functions of the electronic device. This is not specifically limited herein.

The interface unit 808 is an interface for connecting an external apparatus to the electronic device 800. For example, the external apparatus may include a wired or wireless headphone port, an external power supply (or battery charger) port, a wired or wireless data port, a memory card port, a port for connecting an apparatus provided with an identification module, an audio input/output (I/O) port, a video I/O port, an earphone port, and the like. The interface unit 808 may be configured to receive an input (for example, data information and power) from an external apparatus, and transmit the received input to one or more elements in the electronic device 800, or may be configured to transmit data between the electronic device 800 and the external apparatus.

The memory 809 may be configured to store software programs and various data. The memory 809 may mainly include a program storage area and a data storage area. The program storage area may store an operating system, an application program required by at least one function (for example, an audio play function or an image play function), and the like. The data storage area may store data (for example, audio data and contacts) created based on usage of the mobile phone. In addition, the memory 809 may include a high-speed random access memory, and may further include a non-volatile memory such as at least one disk storage device, a flash memory device, or another volatile solid-state storage device.

The processor 810 is a control center of the electronic device, uses various interfaces and lines to connect all parts of the entire electronic device, and performs various functions and data processing of the electronic device by running or executing the software program and/or module stored in the memory 809 and invoking data stored in the memory 809, thereby performing overall monitoring on the electronic device. The processor 810 may include one or more processing units. Optionally, the processor 810 may integrate an application processor and a modem processor. The application processor mainly processes an operating system, a user interface, an application program, and the like. The modem processor mainly processes wireless communication. It can be understood that the modem processor may alternatively not be integrated in the processor 810.

The electronic device 800 may further include the power supply 811 (such as a battery) that supplies power to the components. Optionally, the power supply 811 may be logically connected to the processor 810 by using a power management system, so as to implement functions such as charge management, discharge management, and power consumption management are implemented by using the power management system.

In addition, the electronic device 800 includes some functional modules that are not shown. Details are not described herein.

Optionally, an embodiment of the present disclosure further provides an electronic device, including a processor 810, a memory 809, and a computer program stored in the memory 809 and capable of running on the processor 810. When the computer program is executed by the processor 810, the processes of the foregoing embodiments of the interface display method are implemented, with the same technical effects achieved. To avoid repetition, details are not described herein again.

An embodiment of the present disclosure further provides a computer-readable storage medium, where a computer program is stored in the computer-readable storage medium. When the computer program is executed by a processor, the processes of the foregoing embodiments of the interface display method are implemented, with the same technical effects achieved. To avoid repetition, details are not described herein again. The computer-readable storage medium is, for example, a read-only memory (ROM), a random access memory (RAM), a magnetic disk, or an optical disc.

It may be understood that the embodiments described in this disclosure may be implemented by hardware, software, firmware, middleware, microcode, or a combination thereof. For hardware implementation, a module, a unit, a sub-module, a sub-unit, or the like may be implemented in one or more application-specific integrated circuits (ASIC), digital signal processors (Digital Signal Processing, DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this application, or a combination thereof.

It should be noted that the terms "comprise", "include", or any of their variants in this specification are intended to cover a non-exclusive inclusion, such that a process, a method, an article, or an apparatus that includes a list of elements includes not only those elements but also other elements that are not expressly listed, or further includes elements inherent to such process, method, article, or apparatus. In the absence of more restrictions, an element defined by "including a . . . " does not exclude another same element in a process, method, article, or apparatus that includes the element.

By means of the foregoing description of the implementations, persons skilled in the art may clearly understand that the method in the foregoing embodiments may be implemented by software with a necessary general hardware platform. The method in the foregoing embodiments may also be implemented by hardware. However, in many cases, the former is a preferred implementation. Based on such an understanding, the technical solutions of the present disclosure essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. An interface display method, performed by an electronic device and comprising:
    displaying a time interface, wherein the time interface comprises a first element, the first element being used to indicate the current time, in a case that the time interface is displayed in a form of a dial interface, the first element comprises at least one of an hour hand, a minute hand, or a second hand in the dial interface;
    receiving a first input by a user;
    in response to the first input, displaying a second element corresponding to the first element and canceling display of the first element;
    receiving a second input by the user;
    updating a display location of the second element in response to the second input; and
    updating a screen state of the electronic device in a case that the display location of the second element meets a preset condition, comprising: switching to an always on display state with an updated time interface.

2. The method according to claim 1, wherein before the receiving a second input by the user, the method further comprises:
    displaying a target marker; and
    the updating a screen state of the electronic device in a case that the display location of the second element meets a preset condition comprises:
    in a case that the second element at least partially overlaps the target marker, canceling display of the second element and updating the screen state of the electronic device.

3. The method according to claim 1, wherein the updating a screen state of the electronic device in a case that the display location of the second element meets a preset condition comprises:
    updating the screen state of the electronic device in a case that the display location of the second element is adjacent to or at least partially overlaps a target area.

4. The method according to claim 3, wherein the first element comprises a first sub-element, a second sub-element, and a third sub-element, the second element comprises a fourth sub-element, a fifth sub-element, and a sixth sub-element, the fourth sub- element corresponds to the first sub-element, the fifth sub-element corresponds to the second sub- element, and the sixth sub-element corresponds to the third sub-element; and the updating a screen state of the electronic device in a case that the display location of the second element meets a preset condition comprises:

in a case that a display location of the fourth sub-element is adjacent to or at least partially overlaps a first area, a display location of the fifth sub-element is adjacent to or at least partially overlaps a second area, and a display location of the sixth sub-element is adjacent to or at least partially overlaps a third area, cancelling display of the fourth sub-element, the fifth sub-element, and the sixth sub-element, and updating the screen state of the electronic device; wherein the first area, the second area, and the third area are at least partially located in the target area, or the first area, the second area, and the third area are all adjacent to the target area.

5. The method according to claim 1, wherein the updating a display location of the second element comprises:

updating, based on a posture parameter of the electronic device, the display location of the second element.

6. The method according to claim 1, wherein the time interface comprises a third element, the third element being used to indicate the current time; and the updating a screen state of the electronic device in a case that the display location of the second element meets a preset condition comprises:

in a case that the display location of the second element is adjacent to or at least partially overlaps a display location of the third element, displaying a fourth element corresponding to the third element and canceling display of the second element and the third element;

receiving a third input by the user;

updating a display location of the fourth element in response to the third input; and updating the screen state of the electronic device in a case that the display location of the fourth element meets a preset condition.

7. The method according to claim 6, wherein the time interface comprises a fifth element, the fifth element being used to indicate the current time; and the updating the screen state of the electronic device in a case that the display location of the fourth element meets a preset condition comprises:

in a case that the display location of the fourth element is adjacent to or at least partially overlaps a display location of the fifth element, displaying a sixth element corresponding to the fifth element and canceling display of the fourth element and the fifth element;

receiving a fourth input by the user;

updating a display location of the sixth element in response to the fourth input; and updating the screen state of the electronic device in a case that the display location of the sixth element meets a preset condition.

8. The method according to claim 6, wherein an update speed of the display location of the fourth element is different from an update speed of the display location of the second element.

9. An electronic device, comprising a processor, a memory, and a computer program stored in the memory and capable of running on the processor, wherein the computer program, when being executed by the processor, implements the steps of:

displaying a time interface, wherein the time interface comprises a first element, the first element being used to indicate the current time, in a case that the time interface is displayed in a form of a dial interface, the first element comprises at least one of an hour hand, a minute hand, or a second hand in the dial interface;

receiving a first input by a user;

in response to the first input, displaying a second element corresponding to the first element and canceling display of the first element;

receiving a second input by the user;

updating a display location of the second element in response to the second input; and updating a screen state of the electronic device in a case that the display location of the second element meets a preset condition, comprising: switching to an always on display state with an updated time interface.

10. The electronic device according to claim 9, wherein the computer program, when being executed by the processor, further implements the following step before the step of receiving a second input by the user:

displaying a target marker; and the updating a screen state of the electronic device in a case that the display location of the second element meets a preset condition comprises:

in a case that the second element at least partially overlaps the target marker, canceling display of the second element and updating the screen state of the electronic device.

11. The electronic device according to claim 9, wherein the step of updating a screen state of the electronic device in a case that the display location of the second element meets a preset condition comprises:

updating the screen state of the electronic device in a case that the display location of the second element is adjacent to or at least partially overlaps a target area.

12. The electronic device according to claim 11, wherein the first element comprises a first sub-element, a second sub-element, and a third sub-element, the second element comprises a fourth sub-element, a fifth sub-element, and a sixth sub-element, the fourth sub-element corresponds to the first sub-element, the fifth sub-element corresponds to the second sub-element, and the sixth sub-element corresponds to the third sub-element; and the step of updating a screen state of the electronic device in a case that the display location of the second element meets a preset condition comprises:

in a case that a display location of the fourth sub-element is adjacent to or at least partially overlaps a first area, a display location of the fifth sub-element is adjacent to or at least partially overlaps a second area, and a display location of the sixth sub-element is adjacent to or at least partially overlaps a third area, cancelling display of the fourth sub-element, the fifth sub-element, and the sixth sub-element, and updating the screen state of the electronic device; wherein the first area, the second area, and the third area are at least partially located in the target area, or the first area, the second area, and the third area are all adjacent to the target area.

13. The electronic device according to claim 9, wherein the step of updating a display location of the second element comprises:

updating, based on a posture parameter of the electronic device, the display location of the second element.

14. The electronic device according to claim 9, wherein the time interface comprises a third element, the third element being used to indicate the current time; and the step of updating a screen state of the electronic device in a case that the display location of the second element meets a preset condition comprises:

in a case that the display location of the second element is adjacent to or at least partially overlaps a display location of the third element, displaying a fourth element corresponding to the third element and canceling display of the second element and the third element;

receiving a third input by the user;

updating a display location of the fourth element in response to the third input; and updating the screen state of the electronic device in a case that the display location of the fourth element meets a preset condition.

15. The electronic device according to claim 14, wherein the time interface comprises a fifth element, the fifth element being used to indicate the current time; and the step of updating the screen state of the electronic device in a case that the display location of the fourth element meets a preset condition comprises:

in a case that the display location of the fourth element is adjacent to or at least partially overlaps a display location of the fifth element, displaying a sixth element corresponding to the fifth element and canceling display of the fourth element and the fifth element;

receiving a fourth input by the user;

updating a display location of the sixth element in response to the fourth input; and updating the screen state of the electronic device in a case that the display location of the sixth element meets a preset condition.

16. The electronic device according to claim 14, wherein an update speed of the display location of the fourth element is different from an update speed of the display location of the second element.

17. A non-transitory computer-readable storage medium, wherein the computer-readable storage medium stores a computer program, and the computer program, when being executed by the processor, implements the steps of:

displaying a time interface, wherein the time interface comprises a first element, the first element being used to indicate the current time, in a case that the time interface is displayed in a form of a dial interface, the first element comprises at least one of an hour hand, a minute hand, or a second hand in the dial interface;

receiving a first input by a user;

in response to the first input, displaying a second element corresponding to the first element and canceling display of the first element;

receiving a second input by the user;

updating a display location of the second element in response to the second input; and updating a screen state of the electronic device in a case that the display location of the second element meets a preset condition, comprising: switching to an always on display state with an updated time interface.

18. The method according to claim 1, wherein the second element comprise a movable control corresponding to the first element, and the updating a display location of the second element in response to the second input comprises:

determining a corresponding movement trajectory in the time interface according to the second input, and controlling the second element to move in the time interface based on the determined movement trajectory.

19. The method according to claim 2, wherein the second element comprise a movable control corresponding to the first element; and wherein in the case that the second element at least partially overlaps the target marker, the canceling display of the second element and updating the screen state of the electronic device comprises:

in a case that the movable control at least partially overlaps the target marker during a process of controlling movement of the movable control by the user, canceling display of the movable control, canceling display of the target marker and switching to the always on display state.

20. The method according to claim 1, wherein in the always on display state, the updated time interface comprises only the hour hand and the minute hand.

* * * * *